Oct. 2, 1945.  C. B. BOGUE  2,385,771
TRANSPARENT FILM SEGMENT HOLDER AND PROJECTION MACHINE THEREFOR
Original Filed Oct. 7, 1941  2 Sheets-Sheet 1
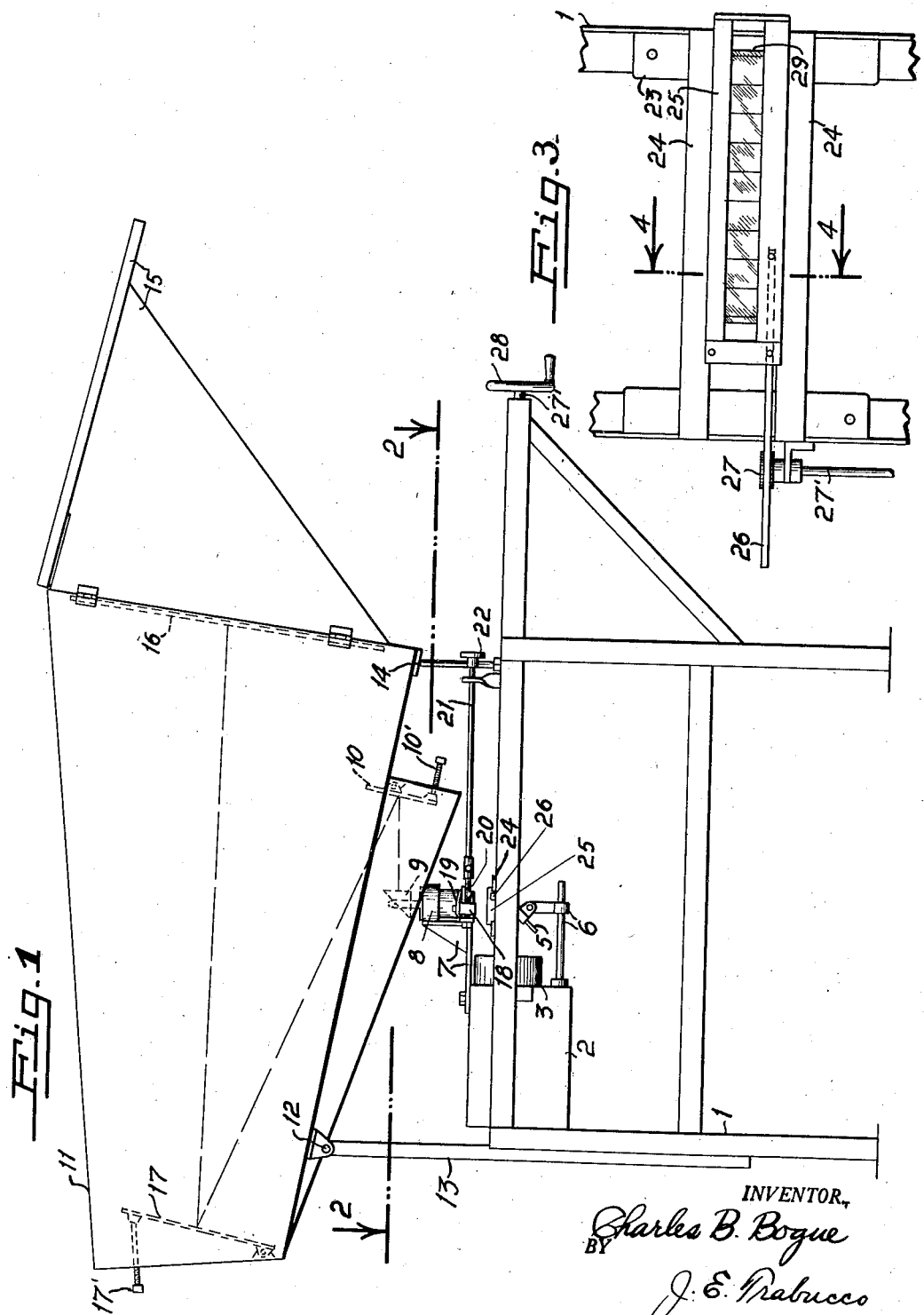
INVENTOR,
Charles B. Bogue
BY
J. E. Trabucco
ATTORNEY.

Oct. 2, 1945.  C. B. BOGUE  2,385,771
TRANSPARENT FILM SEGMENT HOLDER AND PROJECTION MACHINE THEREFOR
Original Filed Oct. 7, 1941  2 Sheets-Sheet 2
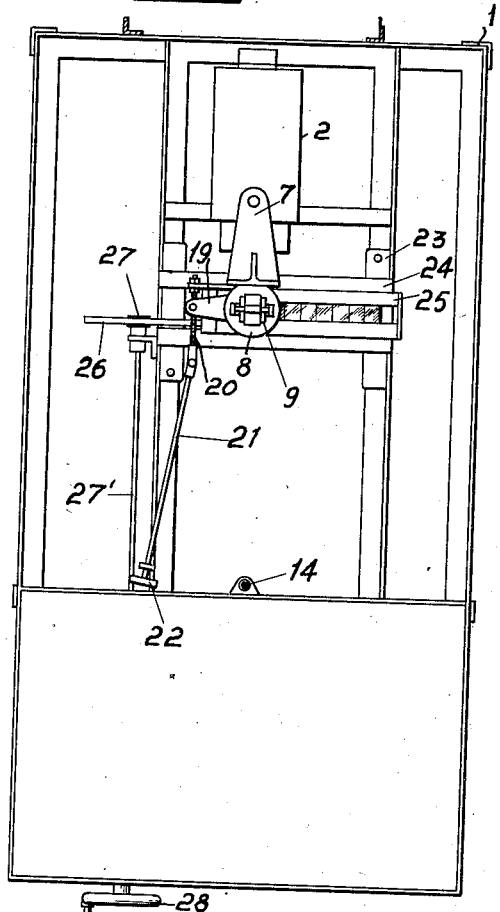
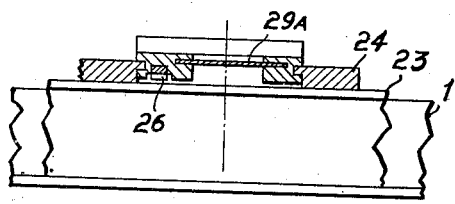
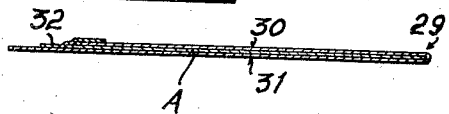
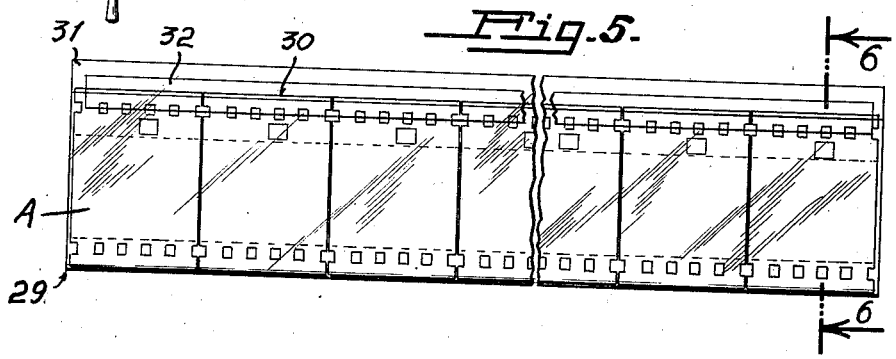
INVENTOR,
Charles B. Bogue
BY
J. E. Trabucco
ATTORNEY.

Patented Oct. 2, 1945

2,385,771

UNITED STATES PATENT OFFICE 2,385,771

TRANSPARENT FILM SEGMENT HOLDER AND PROJECTION MACHINE THEREFOR

Charles B. Bogue, San Francisco, Calif.

Original application October 7, 1941, Serial No. 413,931. Divided and this application July 1, 1942, Serial No. 449,339

2 Claims. (Cl. 88—26)

This invention relates to holders for film segments, and it has for its primary object the provision of a novel transparent container for film segments, which not only retains a number of classified film segments in an assembled group for filing purposes, but permits the projection of the images appearing on the film segments to be projected and viewed without their removal from the container.

Another object of my invention is to provide novel apparatus for successively or selectively projecting the images appearing on a number of film segments contained in a transparent container onto a viewing screen.

Other and further objects of my invention will be pointed out hereinafter, or will be indicated in the appended claims, or will be obvious to one skilled in the art upon an understanding of the present disclosure. For the purposes of this application I have elected to show herein certain forms and details of a film segment holder and means for projecting images from film segments contained therein, which is representative of my invention; it is to be understood, however, that the embodiment of my invention herein shown and described is for the purpose of illustration only, and that therefore it is not to be regarded as exhaustive of the variations of the invention.

This is a division of my application Serial No. 413,931, filed October 7, 1941, now Patent No. 2,338,400, dated January 4, 1944, entitled "Machine for viewing, cutting and segregating photographic film."

In the accompanying drawings, illustrating the preferred embodiment of my invention—

Fig. 1 is a side elevation of a machine for selectively projecting the images appearing on a number of film segments held in a transparent holder;

Fig. 2 is a sectional view taken on the line 2—2 of Fig. 1;

Fig. 3 is an enlarged detailed plan view of a part of the machine, showing a transparent film holder operatively positioned therein;

Fig. 4 is a sectional view taken on the line 4—4 of Fig. 3;

Fig. 5 is a plan view of a transparent film holder embodying the principles of my invention; and Fig. 6 is a sectional view taken on the line 6—6 of Fig. 5.

Referring to the drawings, the numeral 1 designates a supporting frame made preferably from angle irons which are arranged to suitably support the various parts of the machine. Supported at the rear side of the frame 1 is a housing 2 within which a source of light (not shown) is positioned. A lens tube 3 holding a lens 4 projects forwardly from the light housing, and positioned to intercept the light rays passing through the said lens is a mirror 5, the latter being suitably mounted on a supporting structure 6 secured to the housing. Mounted on a bracket 7 which is secured to the light housing 2 is a vertically disposed lens tube 8 which has a suitable lens (not shown) mounted therein. The lens tube is positioned directly above the mirror 5 and the lens therein is disposed with its axis at right angles to the said mirror. Supported above the lens tube 8 is a light reflecting prism 9 which is mounted to reflect the light rays passing upwardly through the vertical lens tube in a forward direction and onto an adjustable mirror 10. The mirror 10 is mounted inside and at the lower side of a suitably shaped enclosure 11. The rear end of the enclosure is pivotally mounted as at 12 on the upper end of vertical posts 13 secured to the frame 1, and the said enclosure's forward end is normally supported by a detachable upright brace 14. The forward end of the enclosure is provided with hinged side wings 15 which shield a frosted translucent panel or screen 16 mounted at the forward end of the enclosure from extraneous light rays. At the rear of the enclosure is an adjustable mirror 17 which is positioned to intercept and reflect the light rays proceeding from the mirror 10 onto the translucent panel 16. Suitable adjusting screws 10' and 17' are associated with the mirrors 10 and 17, respectively, for adjusting purposes. When not being used the enclosure 11 may be swung rearwardly about its pivot 12 to a position where it does not overlie the frame 1.

The lens tube 8 comprises a lower adjustable section which is capable of being rotated for the purpose of bringing the lens it mounts into proper focus with respect to the mirror 5 and the prism 9. A nut 18 (see Fig. 1) connected by a bar 19 to the lower rotatable section of the lens tube 8 is operatively engaged by the threaded section 20 of a forwardly disposed rotatable shaft 21. The turning of a hand piece 22 provided on the forward end of the shaft 21 causes the rotation of the said shaft and the movement of the nut 18 backwardly and forwardly, thereby causing the lower section of the lens tube 8 to be turned so as to adjust the position and focus of the lens carried by the latter.

Removably supported on the frame 1 is a subframe 23 which is provided with two spaced and parallel guide members 24. Slidably mounted on and between the parallel guide members is an open frame 25 which may be reciprocated by means of a rack 26 and a pinion 27, the rack being secured at one end to the said open frame and the pinion being secured to a forwardly disposed shaft 27' having a hand wheel 28 at its forward end. The open frame is provided at its opposite sides with longitudinally disposed opposed slots which are so proportioned and arranged as to receive the opposite edges of a transparent film segment holder 29.

The transparent film holder 29 is preferably formed from a sheet of suitable transparent material such as Cellophane, paper, Celluloid or a plastic composition. The sheet of transparent material when formed into a film segment holder is longitudinally folded or bent to provide two elongated side members 30 and 31. The side members 30 and 31 are preferably of unequal widths and the narrower of the two, namely 30, is slightly narrower than the width of a film segment A. In ordinary practice suitable data concerning the nature of the images appearing on the film segments which are mounted in the transparent holder is inscribed or otherwise affixed longitudinally to the upper margin of the wider side member 31. Several of the film segments, preferably a group having images which are associated or related in some particular manner, are positioned in alignment between the side members 30 and 31, and thereafter a strip of transparent adhesive 32 is secured longitudinally to the adjacent edges of the side members and the film segments. The transparent adhesive strip 32 being in engagement with the film segments, as well as with the two side members 30 and 31, maintains the said film segments in the holder and prevents their disarrangement. The subsequent projection of the images on any of the film segments may be accomplished without its removal from the transparent holder. It is contemplated that the transparent holders 29, together with the film segments A which they contain, be suitably indexed and placed in files where they are readily available to those who from time to time might wish to obtain information concerning the images appearing thereon.

In Fig. 4 the transparent holder 29 and a film segment positioned therein are diagrammatically shown as a single unit designated by the reference character 29A. When the image or images on the film segments A are to be selectively or successively projected onto the frosted panel or screen 16, the open frame 25 containing the transparent holder is positioned so the light rays which are reflected upwardly by the mirror 5 pass through its longitudinal opening and also through the particular film segment that might then be in the path of the said rays. The image appearing on the particular film segment through which the light rays pass is thus projected in the manner heretofore described onto the screen 16.

Having described my invention, what I claim is:

1. In a holder for film segments, an elongated substantially flat transparent casing formed from a transparent sheet bent longitudinally to form overlying sides of unequal widths, the said casing being adapted to hold a plurality of aligned film segments, one of the overlying sides of the casing having a width greater than the width of any of the film segments, and the other of the overlying sides having a width less than the width of any of said film segments, and an adhesive strip substantially the length of the casing secured longitudinally to the side edges of the casing and to the film segments for normally holding the film segments against displacement.

2. In a holder for film segments, a substantially flat transparent casing having overlying sides of unequal widths between which a plurality of film segments of substantially uniform width are adapted to be held, the said sides being joined together longitudinally at adjacent side edges and the widths of the sides being such that the film segments project above the longitudinal edge of the narrower side and below the longitudinal edge of the wider side, and adhesive means secured to the sides and to the film segments for normally holding the segments against displacement.

CHARLES B. BOGUE.